No. 864,888. PATENTED SEPT. 3, 1907.
D. H. DOAK.
TROLLEY WIRE CROSSOVER.
APPLICATION FILED OCT. 11, 1905.

2 SHEETS—SHEET 1.

Witnesses:
Arthur H. Boettcher,
Leonard W. Norander

Inventor
David H. Doak
By Charles A. Brown
Attorney

No. 864,888.
PATENTED SEPT. 3, 1907.
D. H. DOAK.
TROLLEY WIRE CROSSOVER.
APPLICATION FILED OCT. 11, 1905.
2 SHEETS—SHEET 2.
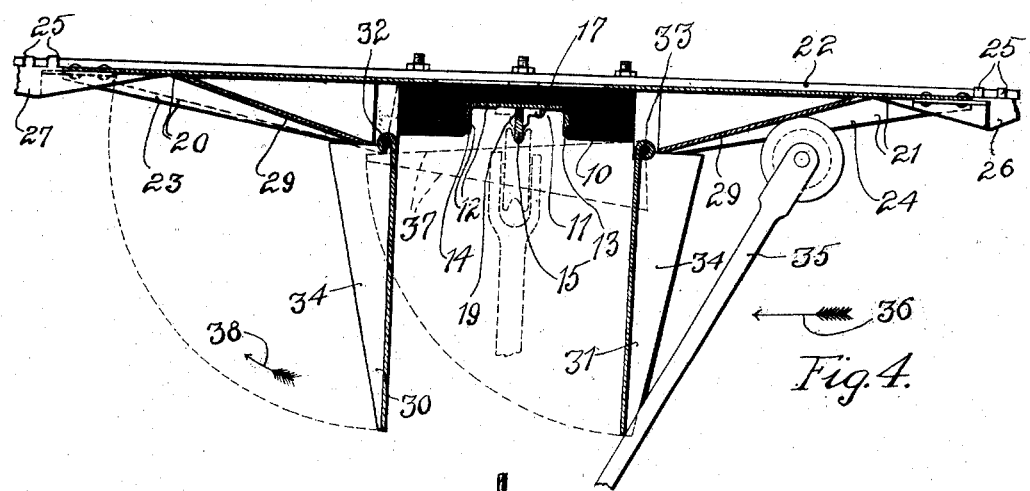
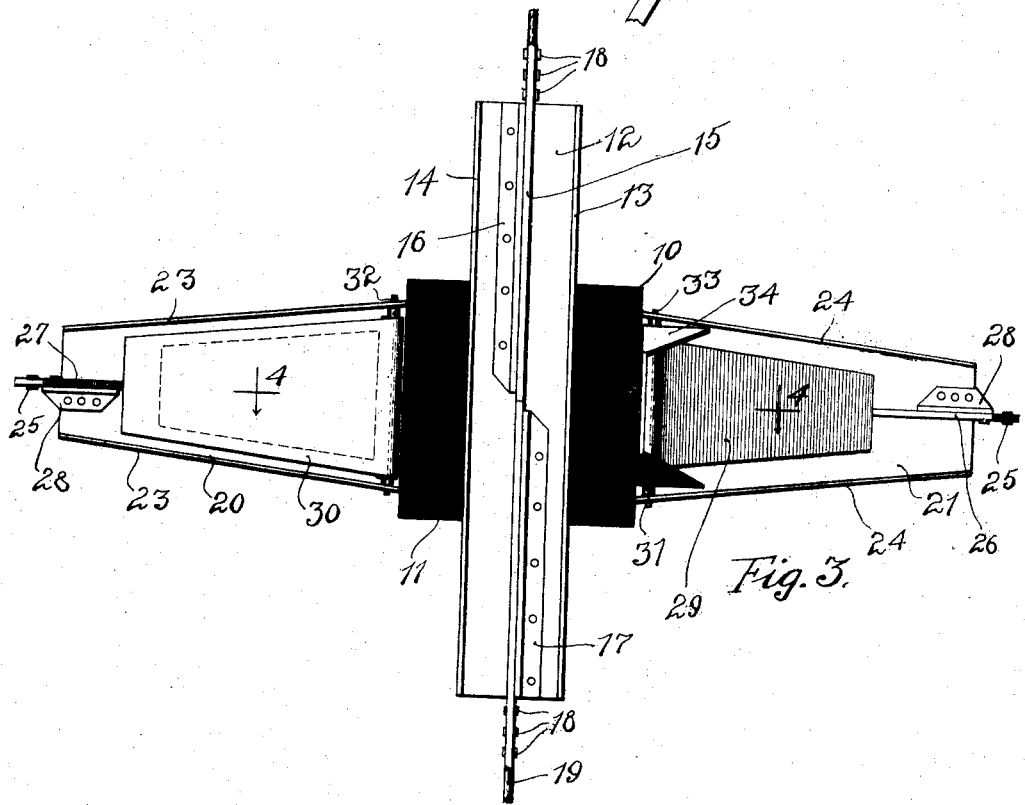
Witnesses:
Arthur H. Boettcher
Leonard W. Novander
Inventor
David H. Doak
By Charles A. Brown
Attorney

UNITED STATES PATENT OFFICE.

DAVID H. DOAK, OF MORGAN PARK, ILLINOIS, ASSIGNOR OF ONE-THIRD TO CHARLES OLDENBURG, OF CHICAGO, ILLINOIS, AND ONE-THIRD TO W. H. CONRAD, OF BLUE ISLAND, ILLINOIS.

TROLLEY-WIRE CROSSOVER.

No. 864,888.  Specification of Letters Patent.  Patented Sept. 3, 1907.

Application filed October 11, 1905. Serial No. 282,229.

*To all whom it may concern:*

Be it known that I, DAVID H. DOAK, a citizen of the United States, residing at Morgan Park, in the county of Cook and State of Illinois, have invented a certain new and useful Improvement in Trolley-Wire Crossovers, (Case No. 1,) of which the following is a full, clear, concise, and exact description, reference being had to the accompanying drawings, forming a part of this specification.

My invention relates to cross-overs for use in connection with overhead trolley systems used on electric railways.

In such systems it frequently occurs that one track must cross another and that the trolley wires also must cross. In such cases it is frequently necessary or desirable to insulate the trolley wires from each other. At the same time it is desirable that the system be so arranged that a car may pass the crossing in either direction at high speed without interrupting the continuity of the electrical connection between the trolley and the trolley feed wire or system and without throwing the trolley from the trolley wire. My invention provides a cross-over in which these requirements are met.

Figure 1:
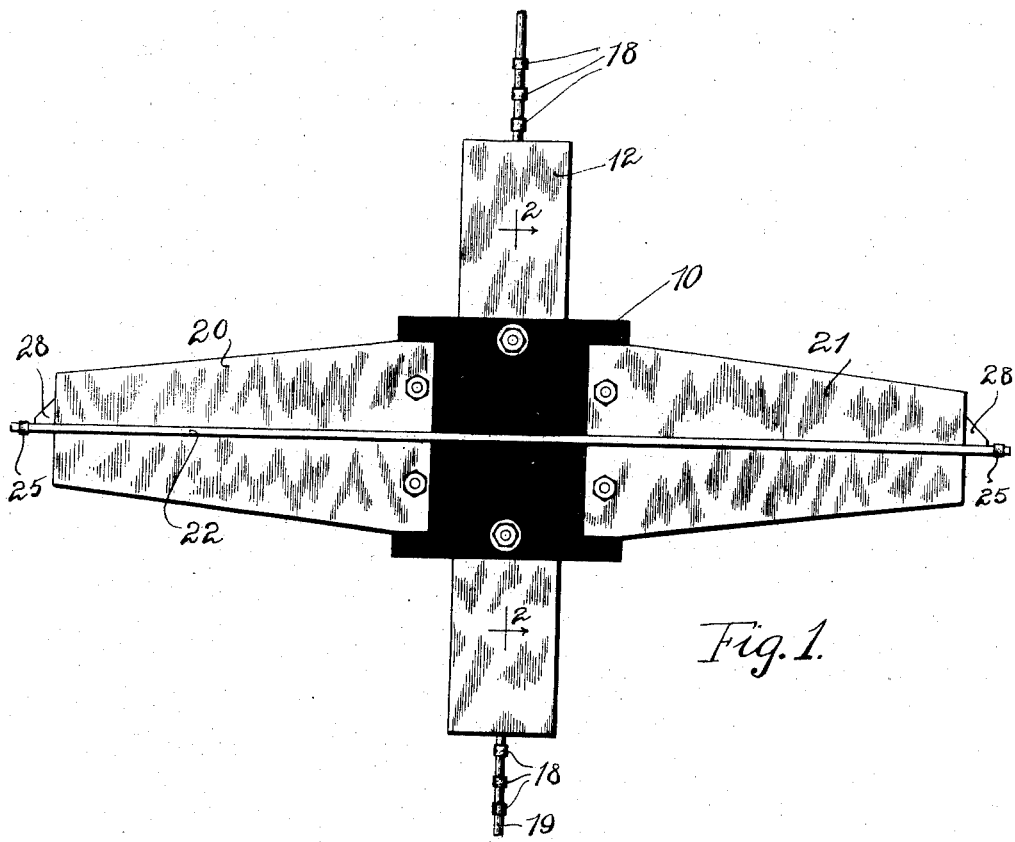
Figure 2:
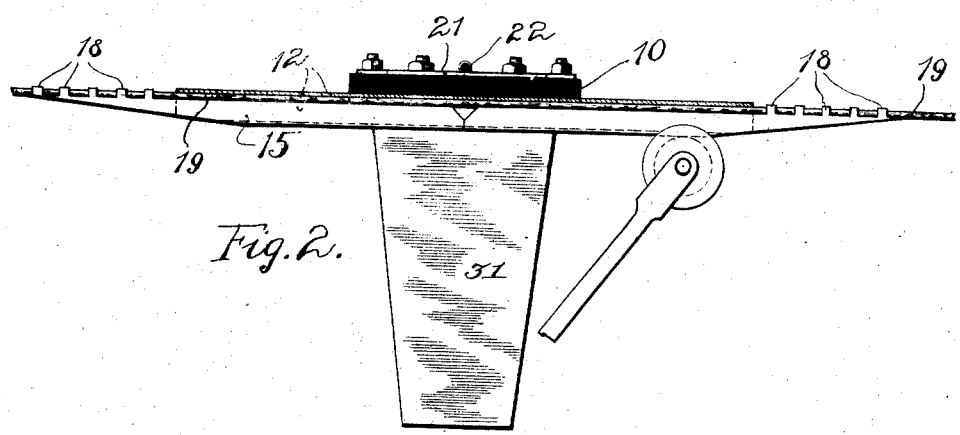

The accompanying drawings illustrate my invention, Figure 1 being a top view of the cross-over, Fig. 2 being a cross sectional view on line 2, 2 of Fig. 1, Fig. 3 being a bottom view of the device, and Fig. 4 being a cross sectional view taken on line 4, 4 of Fig. 3.

Similar reference characters apply to like parts in the various illustrations.

Referring first to Fig. 3, which is a bottom view of the device, it will be noted that there is a block 10 of insulating material, such, for instance, as vulcanized fiber to which the metal parts are attached. A notch is cut into the lower side of this insulating block at 11 and through this notch is run the metal trough 12, the downwardly projecting sides 13 and 14 of this trough serving to guide the trolley in case it slips from the trolley rail 15 extending through the center of the trough and attached thereto by the angle pieces 16 and 17. In the preferred embodiment of my invention, this track 15 is extended beyond the ends of the trough, as best illustrated in Fig. 2, the projecting ends of the track being provided with clips 18 which may be bent over the trolley wire 19 to hold it in place.

The track 15, as best illustrated in Fig. 4, is preferably set off from the bottom of the trough 12 a sufficient distance to permit the trolley wire 19 to extend through the cross-over device without being cut at any point. A trolley passing the crossing in the direction of the wire 19 rides by the cross-over upon the track 15, which gives the trolley a free and unobstructed path and guide over the crossing.

The tapered metal troughs 20 and 21 are attached to the upper side of the insulating block 10. These troughs extend in the direction of the other trolley wire 22. Each of these tapered troughs is provided with downwardly projecting sides which are marked 23 and 24. As illustrated in the drawings, the trolley wire 22 is passed over the top of these troughs, being attached at either end by suitable clips 25 to short guide tracks 26 and 27 which are attached to the troughs by means of the angle pieces 28. The guide tracks 26 terminate a short distance inside the ends of the troughs to which they are attached. Extending inwardly from the terminations of these tracks a sloping runway 29 is provided. These runways are of metal and fasten to the metal troughs within which they are placed.

At the inner side of each sloping runway a swinging runway is provided. These swinging runways are illustrated in the drawings at 30 and 31. They are of metal, are pivoted at 32 and 33, respectively, and are each provided with side walls 34, as shown. The conformation of these swinging runways is such that when the runway is swung from its normal position into the plane of the cross-over, the side walls 34 will lie between the sides of the associated runway and the sides of the associated tapering trough. This is perhaps best illustrated in Fig. 3 where the swinging runway 30 is shown swung up into this abnormal position.

The operation of the device is as follows: A trolley passing in the direction of the wire 19 passes between the depending runways 30 and 31 and does not come into contact with either of them. It passes the cross-over by following the track 15. A trolley passing in the direction of the wire 22 is illustrated at 35. As best illustrated in Fig. 4 this trolley strikes the swinging runway 31 and as it moves in the direction of the arrow 36 this swinging runway is rotated into the position indicated in dotted lines at 37. It will be noted that this runway is arranged to strike the runway 30 before it comes into the position shown in the dotted lines 37, thus causing the runway 30 to swing in the direction of the arrow 38. It will be noted that the swing of the runway 31 is limited by the pivot 32 of the runway 30 so that when the runway 31 is swung into the position indicated in the dotted lines 37 it will not make electrical contact with the track 15. The clearance is made such as to avoid all danger of electrical connection or arcing between the track 15 and the swinging runway. The result is that the trolley passing in the direction indicated by the arrow 36 is guided by the short track 26 on to the stationary runway 29 which may or may not be provided with a guide rib, as desired. This runway guides the trolley to the swinging runway 31 across which it is guided by means of the side walls 34 to the swinging runway 30, which also is pushed upwardly into a position substantially in the plane of the crossover itself and this runway 30 in turn guides the trolley to the track 27 from which it is passed to the trolley wire 22. Thus the trolley passing in the direction of the wire 22 has a continuous metallic path and continuous electrical connection with the source of current supply throughout its passage of the cross-over.

I have found in practice that cars may pass a crossover of this kind at high speed in either direction, either backward or forward, without throwing the trolley from the trolley wire and without interrupting the continuity of the current supply.

Many modifications of the device herein specifically described and illustrated will occur to those skilled in the art and I do not therefore wish to limit myself to the precise construction shown, but claim as my invention:

1. In combination, a block of insulating material, a metal trolley track attached to the lower side of said block and extending continuously across the same, two metal troughs attached to the top of said block and extending to either side of said block, a stationary runway in each of said troughs, and a swinging runway associated with each of said stationary runways, said swinging runways being actuated by the passage of a trolley to span the gap occupied by said continuous trolley track.

2. In a device of the class described, the combination with a block of insulating material having a trough in its under side, of a metal guideway disposed in said trough, a trolley track mounted in said guideway, a metal trough extending from either side of said block and being attached to the top of said block, a stationary runway in each of said troughs, and a swinging runway pivoted in each of said troughs and adapted when swung to one side to span the gap occupied by said trolley track and when swung to the other side to dispose itself within the trough from which it is suspended.

3. In a device of the class descibed, the combination with a trolley guideway extending continuously in one direction, of a pair of troughs mounted with and insulated from said trolley guideway, a stationary runway in each of said troughs, and a swinging runway pivoted in each of said troughs and adapted when swung in one direction to span the gap occupied by said trolley guideway and when swung to the other side to dispose itself within the trough from which it is suspended.

4. In a device of the class described, the combination with a trolley guideway extending in one direction, of a pair of metal troughs extending in another direction mounted with and insulated from said trolley guideway, a swinging runway in each of said troughs adapted when swung to one side to span the gap occupied by said trolley guideway and to engage the other swinging runway to dispose it in the trough from which it is suspended.

In witness whereof, I hereunto subscribe my name this 4th day of October A. D., 1905.

DAVID H. DOAK.

Witnesses:
  WM. LILIENTHAL,
  E. STAUFFER.